United States Patent
Funk

(10) Patent No.: US 7,158,851 B2
(45) Date of Patent: Jan. 2, 2007

(54) FEEDFORWARD, FEEDBACK WAFER TO WAFER CONTROL METHOD FOR AN ETCH PROCESS

(75) Inventor: Merritt Funk, Austin, TX (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 10/609,129

(22) Filed: Jun. 30, 2003

(65) Prior Publication Data

US 2004/0267399 A1     Dec. 30, 2004

(51) Int. Cl.
*G06F 19/00*     (2006.01)
(52) U.S. Cl. ......................................... 700/121; 700/31
(58) Field of Classification Search .................... 700/1, 700/31, 121
See application file for complete search history.

(56) References Cited

U.S. PATENT DOCUMENTS

| | | | |
|---|---|---|---|
| 6,587,744 B1 * | 7/2003 | Stoddard et al. | 700/121 |
| 6,728,591 B1 * | 4/2004 | Hussey et al. | 700/121 |
| 6,748,280 B1 * | 6/2004 | Zou et al. | 700/31 |
| 6,999,848 B1 * | 2/2006 | Helwig | 700/213 |
| 2003/0014145 A1 * | 1/2003 | Reiss et al. | 700/121 |

FOREIGN PATENT DOCUMENTS

| WO | WO 00/79355 A1 | 12/2000 |
|---|---|---|
| WO | WO 03/026001 A2 | 3/2003 |

\* cited by examiner

*Primary Examiner*—Jayprakash N. Gandhi
*Assistant Examiner*—Alexander Kosowski
(74) *Attorney, Agent, or Firm*—Pillsbury Winthrop Shaw Pittman LLP

(57) ABSTRACT

A method of using a run-to-run (R2R) controller to provide wafer-to-wafer (W2W) control in a semiconductor processing system is provided. The R2R controller includes a feed-forward (FF) controller, a process model controller, a feedback (FB) controller, and a process controller. The R2R controller uses feed-forward data, modeling data, feedback data, and process data to update a process recipe on a wafer-to-wafer time frame.

25 Claims, 3 Drawing Sheets

FEEDFORWARD, FEEDBACK WAFER TO WAFER CONTROL METHOD FOR AN ETCH PROCESS

FIELD OF THE INVENTION

The present invention is related to wafer to wafer control methods in a semiconductor processing system, and particularly to a wafer to wafer control method for an etch process.

BACKGROUND OF THE INVENTION

Throughout the various stages of plasma processing, such as semiconductor or display manufacturing, etc., process parameters may vary. Processing conditions can change over time with changes in process parameters creating undesirable results. Small changes can occur in the composition or pressure of an etch gas, process chamber conditions, or wafer temperature. As such, plasma processing facilities require constant monitoring.

The measuring and monitoring of these process parameters at any given time permit valuable data to be accumulated and analyzed. Process control feedback may be used to adjust the process parameters or determine the viability of certain process materials. However, in many cases, changes of process data reflecting deterioration of processing characteristics cannot be detected by simply referring to the process data displayed. It is difficult to detect early stage abnormalities and characteristic deterioration of a process, and often may be necessary to obtain fault detection and prediction, as well as pattern recognition by an advanced process control (APC). Oftentimes a processing tool is not connected to an APC system and the data on the processing tool is not adequately used.

SUMMARY OF THE INVENTION

The present invention is a method and apparatus for providing wafer-to-wafer (W2W) control in a semiconductor processing system. A run-to-run (R2R) controller includes a feed-forward (FF) controller, a process model controller, a feedback (FB) controller, and a process controller. The R2R controller uses feed-forward data, modeling data, feedback data, and process data to update a process recipe on a wafer-to-wafer time frame.

Detailed Description of an Embodiment

The present invention provides a method and apparatus for controlling process parameters at the wafer-to-wafer level. By using closely integrated measurement devices, it is possible to provide real time measurements of the critical dimensions (CD) of the incoming material. For example, the process recipe can include a target CD indicating the desired critical dimension after the process is completed. The purpose of the R2R controller is to provide a set of recipe parameters for each wafer that will achieve the desired results using wafer-to-wafer (W2W) control.

The relationship between the desired process results and the process parameters needed to achieve those results is called the process model. For example, in an etch tool, there can be a simple relationship between the amount of material that needs to be etched, the etch rate and the etch time.

The performance of any process tool is expected to drift over time, and the process model can include drift-related components. It is possible to correct for small deviations in the process model by measuring the actual process result and comparing it with the desired result. This difference can then be used to update the accuracy of the model.

In "real-world" applications of process control, disturbances and noise limit our ability to accurately control the process. These sources of noise and disturbances must be understood and reduced in order to achieve optimal results. For example, if the repeatability of the measurement of the bottom CD in a gate stack is one nanometer out of 40 nanometers total, this represents a relative error of 2.5%. If no correction were made for this measurement error, then we would expect the process result to vary by at least 2.5%.

In developing a R2R control strategy the following items can be considered: the selection of the observed parameters from the measurement devices; the selection of the controlled parameters in the recipe; the algorithm used to determine the values of controlled parameters based on the observed parameters; the definition of range of each of the controlled parameters; the definition of the step size of each of the controlled parameters; the range of the process (how much trim can be performed); the precision of control of the controlled parameters, accuracy of the controlled parameters; a methodology to eliminate noise in the observed parameters; and a methodology to update the process model if necessary.

Figure 1:
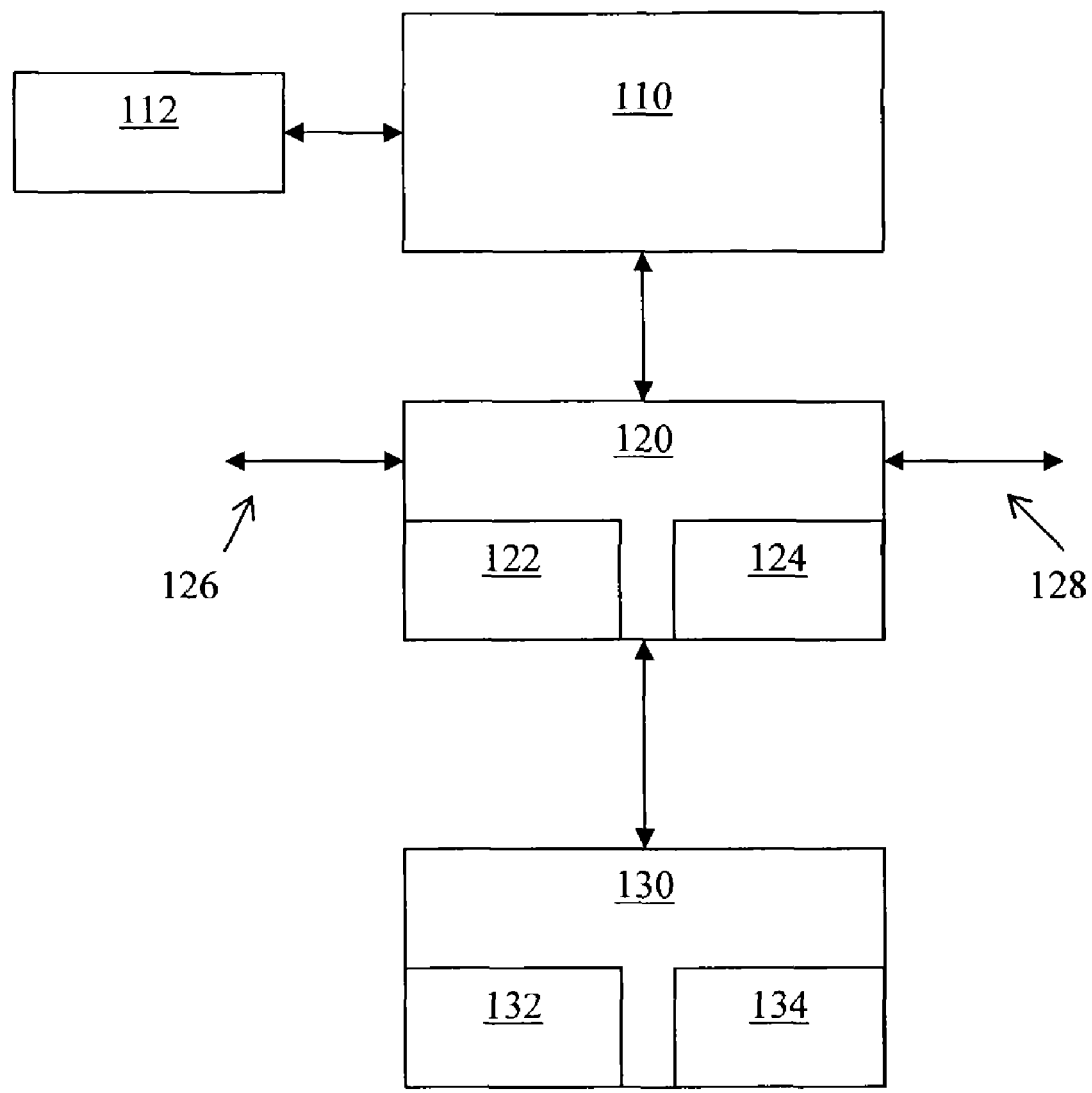
FIG. 1 shows an exemplary block diagram of a processing system in accordance with an embodiment of the present invention.

FIG. 1 shows an exemplary block diagram of a processing system in accordance with an embodiment of the present invention. In the illustrated embodiment, processing system 100 comprises a factory system 110, a run-to-run (R2R) controller 120 coupled to the factory system, and a tool level controller 130 coupled to the R2R controller. In addition, a GUI component 122 and a database component 124 are shown coupled to the R2R controller 120. In alternate embodiments, the GUI component 122 and/or the database component 124 are not require. Also, a GUI component 132 and a database component 134 are shown coupled to the tool level controller 130. In alternate embodiments, the GUI component 132 and/or the database component 134 are not required.

Some setup and/or configuration information can be obtained by the tool level controller 130 and/or the R2R controller 120 from the factory system 110. Factory level business rules can be used to establish a control hierarchy. For example, the tool level controller 130 and/or the R2R controller 120 can operate independently, or can be controlled to some degree by the factory system 110. Also, factory level business rules can be used to determine when a process is paused and/or stopped, and what is done when a process is paused and/or stopped. In addition, factory level business rules can be used to determine when to change a process and how to change the process.

The factory system can monitor some system processes using data reported from the databases associated with the tool level controller 130 and/or the R2R controller 120. Factory level business rules can be used to determine which processes are monitored and which data is used. For example, the tool level controller 130 and/or the R2R controller 120 can independently collect data, or the data collection process can be controlled to some degree by the factory system 110. Also, factory level business rules can be used to determine how to manage the data when a process is changed, paused and/or stopped.

Also, the factory system 110 can provide run-time configuration information to the tool level controller 130 and/or the R2R controller 120. For example, settings, targets, limits, rules, and algorithms can be downloaded from the factory to the tool level controller 130 and/or the R2R controller 120 as an "APC recipe", an "APC system rule", and "APC recipe parameters" at run-time.

Some setup and/or configuration information can be determined by the tool level controller 130 and/or the R2R controller 120 when they are initially configured by an APC system. System level business rules (APC system rules) can be used to establish a control hierarchy. For example, the tool level controller 130 and/or the R2R controller 120 can operate independently, or the tool level controller 130 can be controlled to some degree by the R2R controller 120. Also, APC system rules can be used to determine when a process is paused and/or stopped, and what is done when a process is paused and/or stopped. In addition, APC system rules can be used to determine when to change a process and how to change the process. Furthermore, a tool level controller 130 can use tool level rules to control the some tool level operations.

In general, rules allow system and/or tool operation to change based on the dynamic state of the system.

In FIG. 1, one R2R controller 120 and one tool level controller 130 are shown, but this is not required for the invention. The semiconductor processing system can comprise any number of processing tools having any number of R2R controllers associated with them and independent process modules.

The tool level controller 130 can be used to configure any number of processing tools having any number of process modules associated with them and independent process modules. The tool level controller 130 can collect, provide, process, store, and display data from processes involving processing tools, process modules, and sensors.

The tool level controller 130 can comprise a number of applications including at least one tool-related application, at least one module-related application, at least one sensor-related application, at least one interface-related application, at least one database-related application, at least one GUI-related application, and/or at least one configuration application.

For example, the tool level controller 130 and R2R controller 120 can support an APC system from Tokyo Electron Limited that can include a Unity Tool, Telius Tool and/or a Trias Tool and their associated process modules. Alternately, the tool level controller 130 can support other process tools and other process modules.

GUI component 132 provides easy to use interfaces that enable users to: view tool status and process module status; create and edit x-y charts of summary and raw (trace) parametric data for selected wafers; view tool alarm logs; configure data collection plans that specify conditions for writing data to the database or to output files; input files to statistical process control (SPC) charting, modeling and spreadsheet programs; examine wafer processing information for specific wafers, and review data that is currently being saved to the database; create and edit SPC charts of process parameters, and set SPC alarms which generate email warnings; run multivariate principal component analysis (PCA) and/or partial least squares (PLS) models; and/or view diagnostics screens in order to troubleshoot and report problems with the tool level controller 130.

Raw data and trace data from the tool can be stored as files in the database 134. The amount of data depends on the data collection plans configured by the user, as well as the frequency with which processes are performed and processing tools are run. The data obtained from the processing tools, the processing chambers, the sensors, and the operating system is stored in tables.

In the illustrated embodiment shown in FIG. 1, a single client workstation 112 is shown but this is not required for the invention. The system can support a plurality of client workstations 112. In one embodiment, the client workstation 112 allows a user to perform configuration procedures; to view status including tool, R2R controller, process, and factory status; to view current and historical data; to perform modeling and charting functions; and/or to input data to the R2R controller. For example, a user may be provided with administrative rights that allow him to control one or more processes performed by a R2R controller.

GUI component 122 provides a means of interaction between the R2R controller 120 and a user. When the GUI begins, a logon screen that validates the user identification and password can be displayed and that provides a first level of security. Users can be registered using a security application before logging on. A database check of user identification indicates an authorization level, which will streamline the GUI functions available. Selection items for which the user is not authorized can be displayed differently and be unavailable. The security system also allows a user to change an existing password. For example, the logon panel/screen can be opened from a browser tool such as Netscape or Internet Explorer. A user can enter a user ID and password in the logon fields.

Authorized users and administrators can use GUI panels/screens to modify the R2R controller configuration and default parameters. Configuration data can be stored in an attribute database 124 and can be set up with the defaults at installation.

The GUI component 122 can comprise a status component for displaying the current status for the R2R controller. In addition, the status component can comprise a charting component for presenting system-related and process-related data to a user using one or more different types of charts.

R2R controller 120 comprises link 126 for coupling to at least one other R2R controller that is associated with a process that has been performed before this process and link 128 for coupling to at least one other R2R controller that is associated with a process that is performed after this process. Link 126 and link 128 can be used to feed forward and/or feed back information.

R2R controller 120 is coupled to factory system 110 and can be part of an E-Diagnostic System. The R2R controller 120 can exchange information with the factory system. In addition, the factory system 110 can send command and/or override information to the R2R controller 120. For example, the factory system can feed-forward to the R2R controller downloadable recipes for any number of process modules, tools, and measuring devices, with variable parameters for each recipe. Variable parameters can include final CD targets, limits, offsets, and variables in the tool level system that need to be adjustable by lot. Also, factory litho CD metrology data can be feed-forwarded to R2R controller 120.

Furthermore, the factory system can be used to provide measurement data, such as CD scanning electron microscope (SEM) information, to the R2R controller. Alternately, the CD SEM information can be provided manually. Adjustment factors are used to adjust for any offset between the integrated metrology (IM) and CD SEM measurements. Manual and automated input of CD SEM data includes a timestamp, such as a date, for proper insertion into the history of the feedback (FB) control loop in the R2R controller.

Configurable items can be configured as a set of variable parameters sent from the factory system using general equipment module/semiconductor equipment communications standard (GEM SECS) communications protocol. For example, variable parameters can be passed as part of an "APC Recipe". An APC recipe may contain more than one sub recipes and each sub recipe can contain variable parameters.

R2R controller 120 is coupled to tool level controller 130. Information provided between R2R controller 120 and tool level controller 130 can include feedback and feed-forward data. For example, when an internal reset event is being generated from the tool, the R2R controller 120 can send a message, such as an alarm, to the factory system. This would allow the factory system to make the necessary changes to minimize the number of wafers at risk after a major change occurs (wet clean or parts replacement).

Figure 2:
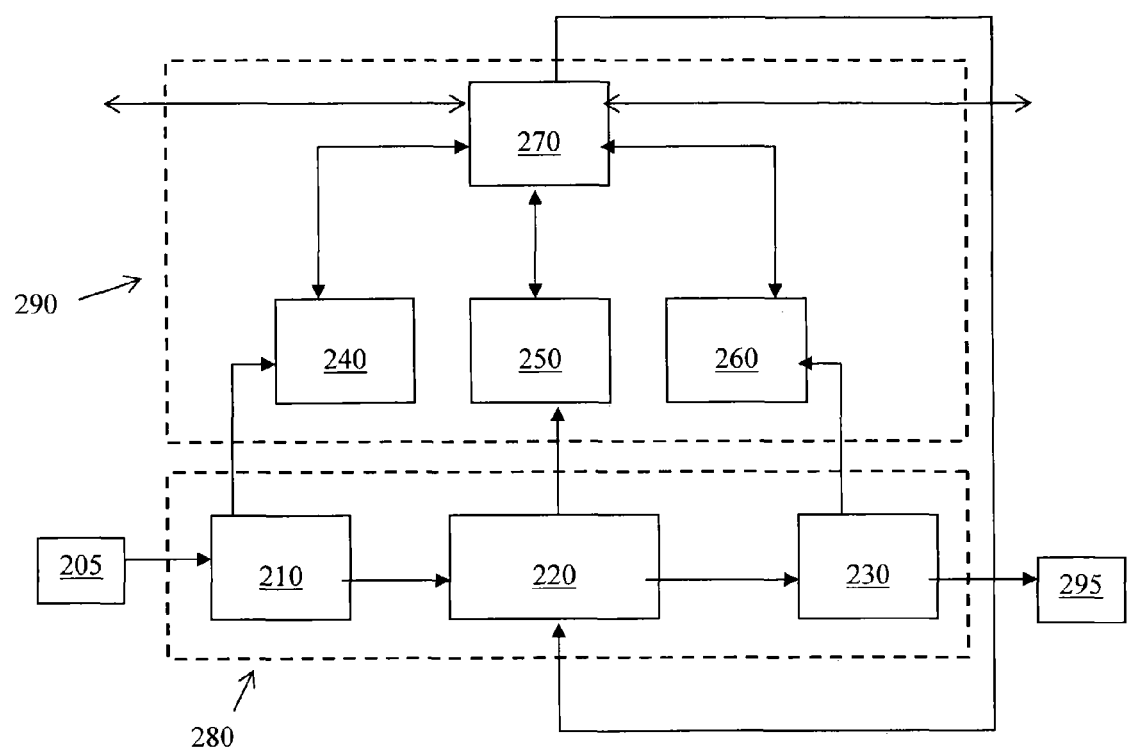
FIG. 2 shows a more detailed block diagram of a processing system in accordance with an embodiment of the present invention.

FIG. 2 shows a more detailed block diagram of a processing system in accordance with an embodiment of the present invention. In the illustrated embodiment, a process tool 280 is shown that comprises a first measurement device 210, process module 220, and second measurement device 230, but this is not required for the invention. Alternately, other configurations can be used.

A R2R controller 290 is also shown in FIG. 2, but this is not required for the invention. Alternately, additional R2R controllers can be used. R2R controller 290 comprises feed-forward (FF) controller 240, process model controller 250, FB controller 260, and process controller 270.

In the illustrated embodiment, a start event 205 provides an input for the first measurement device 210. The first measurement device 210 is coupled to the FF controller 240 and the process module 220. The process module 220 is coupled to the process model controller 250 and the second measurement device 230. The second measurement device 230 is coupled to the FB controller 260. The FF controller 240 and the FB controller 260 are coupled to the process controller 270 that is coupled to the process module 220.

For example, the start event 205 can be a wafer in event, and the start event can comprise data associated with the in-coming wafer. This data can include lot data, batch data, run data, composition data, and wafer history data. Alternately, the start event can be a different process-related event.

The first measurement device 210 can provide a first set of data to the FF controller 240, and can provide a second set of data to the process module 220. Alternately, the two sets of data can comprise the same data. The first measurement device 210 can comprise a single measurement device or multiple measurement devices. The first measurement device 210 can include module related measurement devices, tool-related measurement devices, and/or external measurement devices. For example, data can be obtained from sensors coupled to one or more process modules and sensors coupled to the processing tool. In addition, data can be obtained from an external device such as a SEM tool and an Optical Digital Profiling (ODP) tool. An ODP tool is available from Timbre Technologies Inc. (a TEL company) that provides a patented technique for measuring the profile of a feature in a semiconductor device.

The FF controller 240 can use the difference between a measured critical dimension of the incoming material and a target critical dimension to select or calculate a set of process parameters to achieve the desired result. For example, a predicted wafer state can be determined.

The FF controller 240 uses the first set of data from the first measurement device 210 to predict a first set of process parameters. This predicted set of process parameters can be a first estimate of a recipe to use based on an anticipated result and the first set of data. The first measurement device 210 can provide a first set of data describing a wafer having a first state.

In one case, the FF controller 240 knows the first and second states for the wafer, and the FF controller 240 determines at least one recipe that can be performed on the wafer to change the wafer from first state to the second state.

In another case, the FF controller 240 knows the first and second states for the wafer, and the FF controller 240 determines at least one recipe that can be performed on the wafer to change the wafer from first state to one or more different states that are not the second state.

In another case, the FF controller 240 knows the first and second state for the wafer, and the FF controller 240 determines a set of recipes that can be performed on the wafer to change the wafer from first state to the second state. For example, this can occur when the process is a multi-step process.

The FF controller 240 can use table-based and/or formula-based techniques, and a rule for determining when to switch between techniques can be based on at least one of an input range, an output range, a wafer type, a process type, a module type, a tool type, a wafer state, and/or a process state. For example, the recipes can be in a table, and the FF controller 240 does a table lookup to determine which recipe or recipes provide the best solutions. Alternately, the recipes can be in a set of formulas, and the FF controller 240 determines which recipe formula or recipe formulas provide the best solutions.

When the feed-forward controller 240 uses table-based techniques, the feed-forward control variables are configurable. For example, a variable can be a constant or coefficient in the table. In addition, there can be multiple tables, and a rule for determining when to switch between tables can be based on an input range or an output range.

When the feed-forward controller 240 uses formula based control, the feed-forward control variables are configurable. For example, a variable can be a constant or coefficient in the formula. In addition, there can be multiple formula combinations, and the rule for switching can be accomplished based on an input range or an output range.

The time constant for the FF controller 240 is based on the time between measurements. When measured data is available after a lot is completed, the FF controller's time constant can be based on the time between lots. When measured data is available after a wafer is completed, the FF controller's time constant can be based on the time between wafers. When measurement data is provided real-time during processing, the FF controller's time constant can be based on processing steps, with-in a wafer. When measured data is available while a wafer is being processed or after a wafer is completed or after the lot is completed, the FF controller 240 can have multiple time constants that can be based on the time between process steps, between wafers, and/or between lots.

One or more FF controllers can be operating at any point in time. For example, one FF controller can be in an operating mode while a second FF controller can be in a monitoring mode. In addition, another FF controller can be operating in a simulation mode. A FF controller can provide a single control loop or multiple control loops, and the loops can have different time constants. For example, control loops can be dependent on wafer timing, lot timing, batch timing, chamber timing, tool timing, and/or factory timing.

The FF controller 240 can operate as a single input single output (SISO) device, as a single input multiple output (SIMO) device, as a multiple input single output (MISO) device, and as a multiple input multiple output (MIMO) device. In addition, inputs and outputs can be within a R2R controller and/or between one or more R2R controllers. For example, when multiple inputs such as CD and sidewall angle are being used, inputs and outputs can be fed forward and backward between two modules, (i.e., one for CD control and one for sidewall angle control). In addition, a mask open controller can also be used. In a multi-process case, information can be fed-forward from a first R2R controller to a second R2R controller.

The process module 220 provides the means for changing the wafer from a first state to a second state. For example, the process module 220 can comprise at least one of: an etch module, a deposition module, a polishing module, a coating module, a developing module, a trimming module, and/or a thermal treatment module. In addition, the process module 220 can provide data that comprises the process characteristics that were used to change the wafer from a first state to a second state.

When a processing tool and/or process module contains data, this data can be sent to the R2R controller. For example, this data can include tool trace data, maintenance data, and/or end point detection (EPD) data. The trace data can provide important information about the process. The trace data can be updated and stored during processing, or after the processing of a wafer is completed.

The process model controller 250 predicts a second state of the wafer based on the process characteristics and a process model. For example, an etch rate model can be used along with a processing time to compute an etch depth, and a deposition rate model can be used along with a processing time to compute a deposition thickness. For example, models can include SPC charts, PLS models, PCA models, fault detection/correction (FDC) models, and multivariate analysis (MVA) models. In addition, a modeled wafer state can be determined.

The R2R controller can receive and utilize externally provided data for process parameter limits in a process module. For example, the R2R controller GUI component provides a means for the manual input of the process parameter limits. In addition, a factory level controller can provide limits for process parameters for each process module.

The R2R controller can receive and execute models created by commercially available modeling software. For example, the R2R controller can receive and execute models (PLA, PCA, etc.) that were created by external applications and sent to the controller.

The second measurement device 230 can provide a first set of data to the FB controller 260, and can provide a second set of data to the wafer out event 295. Alternately, the two sets of data can comprise the same data. The second measurement device 230 can comprise a single measurement device or multiple measurement devices. The second measurement device 230 can include process module related measurement devices, tool-related measurement devices, and/or external measurement devices. For example, data can be obtained from sensors coupled to one or more process modules and sensors coupled to the processing tool. In addition, data can be obtained from an external device such as a SEM tool, an optical emissions spectrometer (OES) tool, and an Optical Digital Profiling (ODP) tool. An ODP tool is available for Timbre Technologies Inc. (a TEL company) that provides a patented technique for measuring the profile of a feature in a semiconductor device.

The FB controller 260 uses the first set of data from the second measurement device 230 to compute a first set of process deviations. This computed set of process deviations can be determined based on an anticipated wafer state and the first set of data from the second measurement device 230. For example, a measured wafer state can be determined.

The second measurement device 230 can provide a first set of data describing a wafer having a second state. In one case, the FB controller 260 knows the desired state and second state for the wafer, and the FB controller 260 determines the differences between the desired state and the second state. In this manner, the measured actual process results are compared with the desired process results in order to determine a correction to the process recipe.

In another case, the FB controller 260 knows the desired state and the second state for the wafer, and the FB controller 260 determines a set of corrections that can be performed on the wafer to change the wafer from the second state to the desired state. For example, this can occur when the process is a multi-step process.

The FB controller 260 can use table-based and/or formula-based techniques. For example, the recipes can be in a table, and the FB controller 260 does a table lookup to determine which correction or corrections provide the best solutions. Alternately, the corrections can be determined using a set of formulas, and the FB controller 260 determines which correction formula or corrections formulas provide the best solutions.

When the FB controller 260 uses table-based techniques, the feedback control variables are configurable. For example, a variable can be a constant or coefficient in the table. In addition, there can be multiple tables, and rule-based switching can be accomplished based on an input range or an output range.

When the FB controller 260 uses formula based control, the feedback control variables are configurable. For example, a variable can be a constant or coefficient in the formula. In addition, there can be multiple formula combinations, and rule-based switching can be accomplished based on an input range or an output range.

In some cases, the FB controller 260 does not need to use a lookup table or a formula method to adjust a target CD. For example, a simple delta between a factory provided target CD and a filtered metrology CD can be applied as a correction.

The time constant for the FB controller 260 is based on the time between measurements. When measured data is available after a lot is completed, the FB controller's time constant can be based on the time between lots. When measured data is available after a wafer is completed, the FB controller's time constant can be based on the time between wafers. When measured data is available after a wafer is completed and after the lot is completed, the FB controller 260 can have multiple time constants that can be based on the time between wafers and between lots.

One or more FB controllers can be operating at any point in time. For example, one FB controller can be in an operating mode while a second FB controller can be in a monitoring mode. In addition, another FB controller can be operating in a simulation mode. A FB controller can provide a single control loop or multiple control loops, and the loops can have different time constants. For example, loops can be dependent on wafer timing, lot timing, batch timing, chamber timing, tool timing, and/or factory timing.

Model updates are another form of feedback that can take place by running monitor wafers, varying the process settings and observing the results, then updating the model. For example a model update can take place every 80 processing hours by measuring the before and after film characteristics of a monitor wafer. By changing the settings over time to check different operating regions one could validate the complete operating space over time, or run several monitor wafers at once with different recipe settings. The model update can take place within the R2R controller at the tool or at the factory, allowing the factory control to manage the monitor wafers and model updates.

The FB controller 260 can operate as a SISO device, as a SIMO device, as a MISO device, and as a MIMO device. In addition, inputs and outputs can be within a R2R controller and/or between one or more R2R controllers. For example, when multiple inputs such as CD and sidewall angle are being used, inputs and outputs can be fed forward and backward between two modules, (i.e., one for CD control and one for sidewall angle control). In addition, a mask open controller can also be used. In a multi-process case, information can be fed-forward from a first R2R controller to a second R2R controller.

The process controller 270 computes an updated recipe for the next wafer. In one case, the process controller 270 uses the feed-forward information from the FF controller 240, the modeling information from the model controller 250, and the feedback information from the FB controller 260 to determine whether or not to change the current recipe before running the current wafer. In another case, the process controller 270 uses the feed-forward information from the FF controller 240, the modeling information from the model controller 250, and the feedback information from the FB controller 260 to determine whether or not to change the current recipe before running the next wafer.

The process controller 270 can use table-based and/or formula-based techniques, and can use a rule-based method to determine which technique to use. For example, the recipes can be in a table, and the process controller 270 does a table lookup to determine which recipe or recipes provide the best solutions. Alternately, the recipes can be determined using a set of formulas, and the process controller 270 determines which recipe formula or recipe formulas provide the best solutions.

When the process controller 270 uses table-based techniques, the control variables are configurable. For example, a variable can be a constant or coefficient in the table. In addition, there can be multiple tables, and the rule for switching can be accomplished based on an input range or an output range.

When the process controller 270 uses formula based control, the control variables are configurable. For example, a variable can be a constant or coefficient in the formula. In addition, there can be multiple formula combinations, and the rule for switching can be accomplished based on an input range or an output range. The time constant for the process controller 270 is based on the time between measurements. When measured data is available after a lot is completed, the process controller's time constant can be based on the time between lots. When measured data is available after a wafer is completed, the process controller's time constant can be based on the time between wafers. When measured data is available after a wafer is completed and after the lot is completed, the process controller 270 can have multiple time constants that can be based on the time between wafers and between lots.

One or more process controllers can be operating at any point in time. For example, one process controller can be in an operating mode while a second process controller can be in a monitoring mode. In addition, another process controller can be operating in a simulation mode. A process controller can provide a single control loop or multiple control loops, and the loops can have different time constants. For example, loops can be dependent on wafer timing, lot timing, batch timing, chamber timing, tool timing, and/or factory timing.

The process controller can operate as a SISO device, as a SIMO device, as a MISO device, and as a MIMO device. In addition, inputs and outputs can be within a R2R controller and/or between one or more R2R controllers. For example, when multiple inputs such as CD and sidewall angle are being used, inputs and outputs can be fed forward and backward between two modules, (i.e., one for CD control and one for sidewall angle control). In addition, a mask open controller can also be used. In a multi-process case, information can be fed-forward from a first R2R controller to a second R2R controller.

The R2R controller 290 can comprises one or more filters (not shown) to filter the metrology data in order to remove random noise. For example, a filter can be applied to the input or to the output of a controller. In one case, the filter can be applied to the incoming variable to allow for filtering without concern of the method of control (i.e., independent of using a lookup table or an equation). This also enables the controller to change output variables over a range of control, such as changing a flow rate in small steps, then making a change in pressure and stair stepping a flow rate change.

An outlier filter can be used to remove outliers that are statically not valid and should not be considered in the mean of a wafer measurement. The outlier filter can be used to eliminate both high and low outliers from the mean. For example, a box and whisker method can be applied to the site metrology data. This method is effective, is simple to maintain without absolute limits, allows one set of filtering limits to be applied to a varying set of incoming CD mean data (the target can change without effecting the filter limits) and is simple to visualize. With an outlier filter additional rules can be maintained (minimum number of points in a wafer to statically represent the wafer and the minimum number of wafers to represent a lot.)

A noise filter can be used to remove random noise and stabilize the control loop, an Exponentially Weighed Moving Average (EWMA) or Kalman filter can be applied. When a filter is used, the filter time constant has to be set (in case of EWMA, Lambda is the time constant). For example, EWMA calculations can be made using the complete history each time, in order to capture data points that are added out of order, by processing date and time.

The R2R controller can receive and utilize feed forward data. For example, the R2R controller can receive information about incoming material to be processed and the desired process results (target CD), and the R2R controller can provide a set of recipe parameters to achieve the desired process results. The R2R controller can receive and utilize feedback data. For example, the R2R controller can receive information about material that has already been processed and adjust the process model based on this data. The R2R controller can receive and utilize feedback data that is delayed. For example, the R2R controller can receive information about material that has already been processed and adjust the process model based on this data even though the data is not received in the order in which it was processed by the tool. The R2R controller can receive and utilize manually entered data for configuring and controlling the controller. For example, the R2R controller GUI component provides a means for the manual input of the controller configuration information.

The R2R controller can send and receive notification of exception conditions. For example, the R2R controller can send and receive notifications to and from a factory level controller or a tool level controller. In addition, a notification can be sent via the e-Diagnostics network, email, or pager after the identification of an exception condition.

The R2R controller can run in a simulated mode. For example, the R2R controller can operate in simulation mode in parallel with the actual process mode. In this case, the simulated actions can be recorded in the R2R controller log and historical database, and immediate action is not taken.

The process model not only provides input parameters for gas flow rates but also provides input parameters for gas flow rate ratio. For example, the R2R controller can calculate and establish a gas flow ratio and adjust the total flow of the combined gases.

The R2R controller can select process models based on incoming material context. For example, the R2R controller can select process models based on the incoming material state and process recipe. The R2R controller can comprise means to verify that the system can calculate a valid R2R setting. For example, the R2R controller can comprise means to verify recipe parameter settings prior to lot start. The R2R controller can comprise means to use default settings of recipe set points. For example, when the R2R controller cannot provide recipe parameters for a particular wafer, the recipe parameters in the "nominal" recipe can be used.

The R2R controller can comprise a database component for archiving input and output data. For example, the R2R controller can archive received inputs, sent outputs, and actions taken by the controller in a searchable database. In addition, the R2R controller can comprise means for data backup and restoration. Also, the searchable database can include model information, configuration information, and historical information and the R2R controller can use the database component to backup and restore model information and model configuration information both historical and current.

The R2R controller can comprise a web based user interface. For example, the R2R controller can comprise a web enabled GUI component for viewing the data in the database.

The R2R controller can comprise a security component that can provide for multiple levels of access depending on the permissions granted by a security administrator.

The R2R controller comprises a set of default models that are provided at installation time, and has the ability to reset to default conditions.

The R2R controller can take various actions depending on the nature of the exception. For example, exception conditions can include: missing measured data, missing target CD, metrology error, recipe parameter limit exceeded, process module parameter limit exceeded, and feedback event received out of order.

The R2R controller inputs can include Instructions, substrate state, module physical state, process state, and controller parameters. In addition, the R2R controller inputs can include time constants for feed-forward/feedback loops, a reset event for accumulation, an IM step, and ODP offset. Instructions can include targets, tolerances, computational commands, data collection plans, algorithms, models, coefficients, and recipes. The substrate state can include information from the substrate being processed (site, wafer, lot, batch state), profiles, and characteristics measured physically or electrically. The module physical state can include the current or last known recorded state of the module and components that will be used to process the substrate—RF hours, number of wafers, consumable states. The process state can include the current or last known measured state from sensors of the processing environment, including trace data, and summary statistics. The controller parameters can include the last settings for the recipe/controller set points and process targets that created the substrate state, module physical state, and process state.

The R2R controller outputs can include the following items: derived parameters, settings, an event or message, Intervention, derived context, log message, and history. For example, data to be sent to offline systems for analysis. The derived parameters can include information generated by the controller that can represent the state of the controller, the process, the material, or the equipment. Settings can include process tool parameters that are calculated by the R2R controller and are typically downloaded to the tool at runtime. For example these parameters can include time by step, pressure, temp, gas flows, and/or power. An event or message can include information indicating that an exception has occurred in the system being controlled. Intervention can include information concerning an action that is recommended (or taken) by the R2R controller based on analysis results. Derived context can include context information that is derived by the R2R controller. The log message can be a text message describing the activities of the R2R controller. The history item can include data to be sent to offline systems for decision support systems (DSS) type of analysis.

The R2R controller can comprise at least one computer and software that supports multiple controller applications. The R2R controller can comprise at least one storage device that stores data. For example, at least one computer can comprise operational software, such as the Ingenio software, from Tokyo Electron. In one case, the operational software comprises at least one of: a configuration means, a data management means, a GUI means, a fault management means, and a trouble-shooting means. Also, configuration GUI screens can be used to configure the interface between the computer and the processing element, to determine the device type for the processing element (i.e., tool, module, sensor, etc.), and data management GUI screens can be used to determine the amount and type of data to collect, and to determine how to and where to store the collected data. Furthermore, fault management GUI screens can be used to inform a user about fault conditions.

Figure 3:
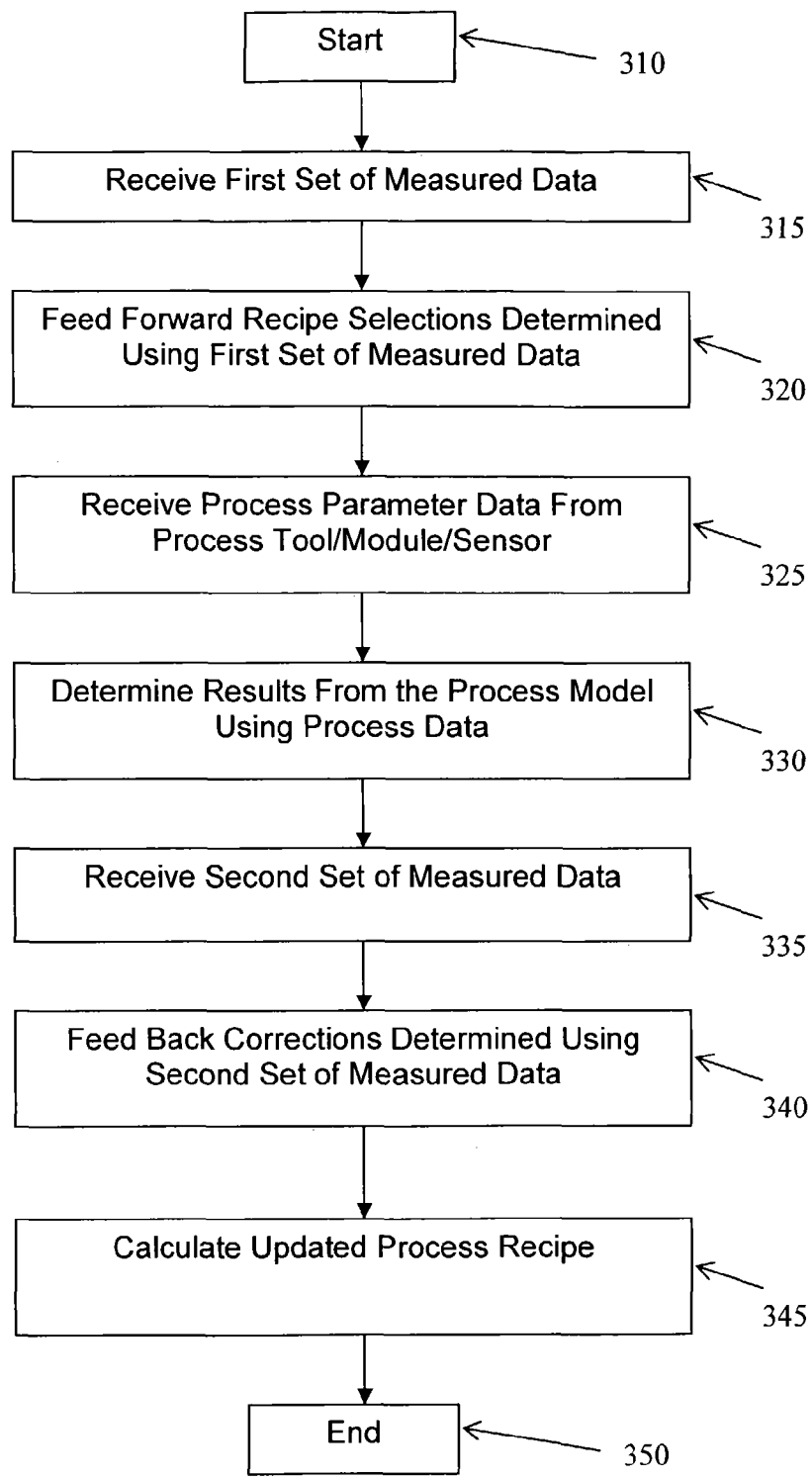
FIG. 3 illustrates a flow diagram for a method of operating a R2R controller in accordance with an embodiment of the present invention.

FIG. 3 illustrates a flow diagram for a method of operating a R2R controller in accordance with an embodiment of the present invention. Procedure 300 starts at 310. For example, the R2R controller can be coupled to at least one processing tool that can comprise at least one processing module, and at least one measuring device. For example, the R2R controller can be provided by Tokyo Electron, and the processing tool can include a cluster tool, such as one from Tokyo Electron. Also, the R2R controller can comprise a computer including operational software, a database coupled to the R2R controller, and a GUI coupled to the R2R controller. The operational software can associate an APC recipe with a control job, and sub recipes are provided within the APC recipe. The APC recipe and sub recipes follow the SEMI formatted recipe standard. The formatted recipes are compatible with the factory system's recipe editor.

In 315, the R2R controller can receive a first set of measured data that describes the incoming material (before processing). For example, the first set of measured data can be from a first measuring device such as an ODP tool. In addition, the first set of data can include SEM data and optical data. Also, the first set of data can comprise wafer data including physical data, electrical data, and processing data.

In 320, the FF controller, in the R2R controller, makes a recipe selection and feed-forwards the selection to the process controller. The FF controller can use a table-based and/or a formula-based technique for determining the best recipe. The FF controller receives information about incoming material to be processed and the desired process results, and the FF controller provides at least one recipe selection that it has determined will achieve the desired process results. The FF controller can apply limits to the received information and can provide windows around the desired process results. The FF controller can include the current recipe and a nominal recipe in the selection process.

In 325, the R2R controller can receive process data. For example, the process data can be from a processing tool, a process module (chamber), and/or a process sensor.

In 330, the model controller, in the R2R controller, determines a set of results based on the in-coming wafer state and at one process model. For example, the process model can be based on the current state of the process module (chamber).

In 335, the R2R controller can receive a second set of measured data that describes the out-going material (after processing). For example, the second set of measured data can be from a second measuring device such as an ODP tool. In addition, the second set of data can include SEM data and optical data. Also, the second set of data can comprise wafer data including physical data, electrical data, and processing data.

In 340, the FB controller, in the R2R controller determines a set of corrections based on the second set of measured data. The FB controller can use a table-based and/or a formula-based technique for determining the corrections. The FB controller receives information about outgoing material (after processing) and the desired process results, and the FB controller provides at least one correction that it has determined represents the difference between the achieved results (after processing) and the desired process results. The FB controller can apply limits to the received information and can provide windows around the corrections. The FB controller can include the current data, delayed data, and/or historical data to determine the correction.

In 345, process controller, in the R2R controller, calculates an updated process recipe. The process controller uses the results from the FF controller, the model controller, and the FB controller to calculate an updated recipe. The process controller can use a table-based and/or a formula-based technique for determining the updated recipe. The process controller receives information about incoming material (before processing), receives information about out-going material (after processing), receives modeling information, receives processing data, and the desired process results. The process controller provides at least one update recipe that it has determined will correct for the difference between the achieved results (after processing) and the desired process results. The process controller can apply limits to the received information and can provide windows around the update recipe parameters. The process controller can include the current data, delayed data, and/or historical data to determine the updated recipe. At 350, the process ends.

Numerous modifications and variations of the present invention are possible in light of the above teachings. It is therefore to be understood that, within the scope of the appended claims, the invention may be practiced otherwise than as specifically described herein.

What is claimed is:

1. A method of operating a semiconductor processing system comprising:
    determining a first state for a wafer via optical digital profiling using critical dimension data and sidewall angle data;
    determining a second state for the wafer via optical digital profiling using critical dimension data and sidewall angle data;
    determining a process recipe to change the state of the wafer from the first state to the second state;
    performing the process recipe on the wafer, wherein the state of the wafer changes from the first state to a processed state;
    determining when the processed state is not the second state; and
    updating the process recipe.

2. The method of operating a semiconductor processing system as claimed in claim 1, wherein the determining of the first state further comprises measuring at least one of an electrical property and a physical property.

3. The method of operating a semiconductor processing system as claimed in claim 1, wherein the determining of the first state further comprises receiving at least one of electrical data and physical data.

4. The method of operating a semiconductor processing system as claimed in claim 1, wherein the determining of the second state further comprises measuring at least one of an electrical property and a physical property.

5. The method of operating a semiconductor processing system as claimed in claim 1, wherein the determining of the second state for a wafer further comprises receiving at least one of electrical data and physical data.

6. The method of operating a semiconductor processing system as claimed in claim 1, wherein the determining of the process recipe comprises feeding forward at least one process recipe based on the first and second state of the wafer.

7. The method of operating a semiconductor processing system as claimed in claim 1, wherein the determining of the process recipe comprises predicting the second state using the first state of the wafer and a process model based on the process conditions.

8. The method of operating a semiconductor processing system as claimed in claim 1, further comprising:
    determining differences between the processed state and the second state; and
    feeding back the differences.

9. A method of operating a semiconductor processing system comprising:
    determining a first state for a wafer via optical digital profiling using critical dimension data and sidewall angle data;

substantially simultaneously determining a second state for the wafer via optical digital profiling using critical dimension data and sidewall angle data;
substantially simultaneously determining a predicted state for the wafer, wherein a predicted process recipe is used to change the state of the wafer from the first state to the predicted state;
substantially simultaneously determining a modeled state for the wafer, wherein a process module is used to change the state of the wafer from the first state to the modeled state;
substantially simultaneously determining a measured state for the wafer, and
determining a recipe for changing the wafer state to the second state using the first state, the predicted state, the modeled state, and the measured state.

10. A method of operating a semiconductor processing system comprising:
determining a first state for a wafer via optical digital profiling using critical dimension data and sidewall angle data, wherein the determining the first state uses filtered metrology data;
determining a second state for the wafer via optical digital profiling using critical dimension data and sidewall angle data, wherein the determining the second state uses filtered metrology data;
determining a process recipe to change the state of the wafer from the first state to the second state;
performing the process recipe on the wafer, wherein the state of the wafer changes from the first state to a processed state;
determining when the processed state is not the second state; and
updating the process recipe.

11. The method of operating a semiconductor processing system as claimed in claim 10, wherein the determining of the first state further comprises measuring at least one of an electrical property and a physical property.

12. The method of operating a semiconductor processing system as claimed in claim 10, wherein the determining of the first state further comprises receiving at least one of electrical data and physical data.

13. The method of operating a semiconductor processing system as claimed in claim 10, wherein the determining of the second state further comprises measuring at least one of an electrical property and a physical property.

14. The method of operating a semiconductor processing system as claimed in claim 10, wherein the determining of the second state for a wafer further comprises receiving at least one of electrical data and physical data.

15. The method of operating a semiconductor processing system as claimed in claim 10, wherein the determining of the process recipe comprises feeding forward at least one process recipe based on the first and second state of the wafer.

16. The method of operating a semiconductor processing system as claimed in claim 10, wherein the determining of the process recipe comprises predicting the second state using the first state of the wafer and a process model based on the process conditions.

17. The method of operating a semiconductor processing system as claimed in claim 10, further comprising:
determining differences between the processed state and the second state; and
feeding back the differences.

18. A method of operating a semiconductor processing system comprising:
determining a first state for a wafer via optical digital profiling using critical dimension data and sidewall angle data, wherein determining the first state comprises measuring a bottom critical dimension in a gate stack;
determining a second state for the wafer via optical digital profiling using critical dimension data and sidewall angle data, wherein determining the second state comprises measuring a bottom critical dimension in a gate stack;
determining a process recipe to change the state of the wafer from the first state to the second state;
performing the process recipe on the wafer, wherein the state of the wafer changes from the first state to a processed state;
determining when the processed state is not the second state; and
updating the process recipe.

19. The method of operating a semiconductor processing system as claimed in claim 18, wherein the determining of the first state further comprises measuring at least one of an electrical property and a physical property.

20. The method of operating a semiconductor processing system as claimed in claim 18, wherein the determining of the first state further comprises receiving at least one of electrical data and physical data.

21. The method of operating a semiconductor processing system as claimed in claim 18, wherein the determining of the second state further comprises measuring at least one of an electrical property and a physical property.

22. The method of operating a semiconductor processing system as claimed in claim 18, wherein the determining of the second state for a wafer further comprises receiving at least one of electrical data and physical data.

23. The method of operating a semiconductor processing system as claimed in claim 18, wherein the determining of the process recipe comprises feeding forward at least one process recipe based on the first and second state of the wafer.

24. The method of operating a semiconductor processing system as claimed in claim 18, wherein the determining of the process recipe composes predicting the second state using the first state of the wafer and a process model based on the process conditions.

25. The method of operating a semiconductor processing system as claimed in claim 18, further comprising:
determining differences between the processed state and the second state; and
feeding back the differences.

* * * * *